(Model.)

6 Sheets—Sheet 1.

P. W. LEFFLER.
Wire Barbing Machine.

No. 232,831.  Patented Oct. 5, 1880.

Witnesses
Jas. M. Wishart
Louis Steele

Inventor
Paul William Leffler
by W. B. Richards atty

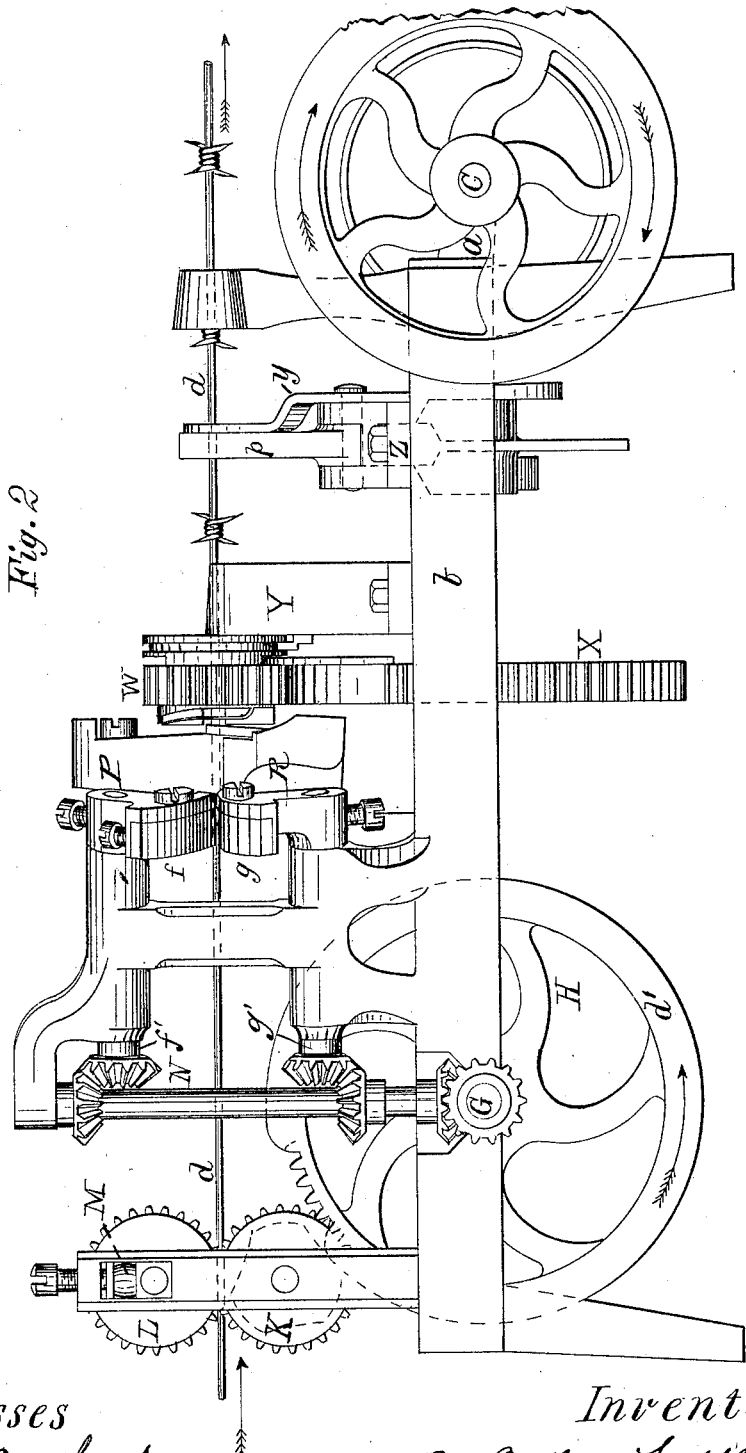

(Model.)
P. W. LEFFLER.
Wire Barbing Machine.
No. 232,831.  Patented Oct. 5, 1880.
6 Sheets—Sheet 3.
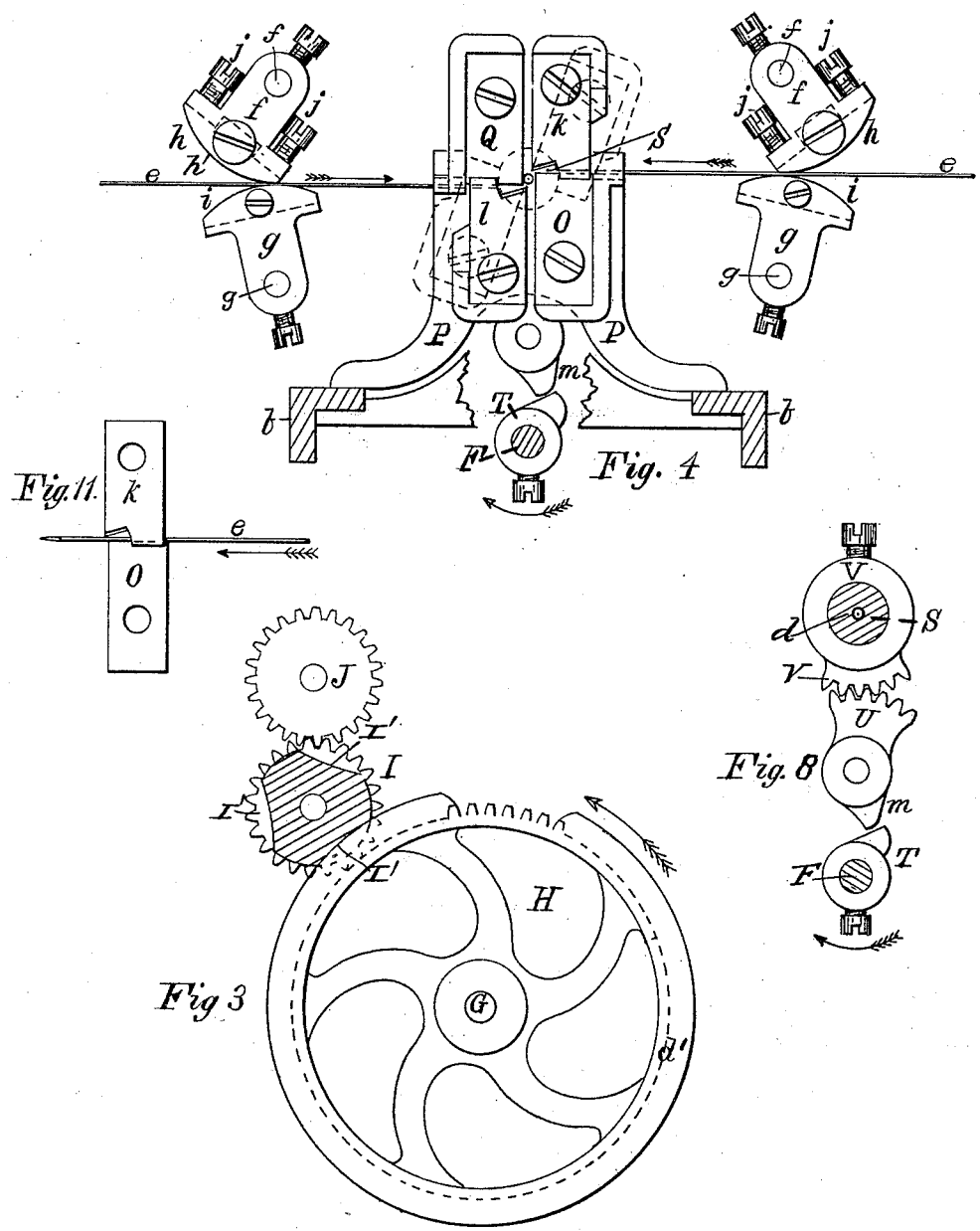
Witnesses
Jas. M. Urshart
Louis Stute
Inventor
Paul William Leffler
per W. B. Richards atty (Model.)
P. W. LEFFLER.
Wire Barbing Machine.
No. 232,831. Patented Oct. 5, 1880.
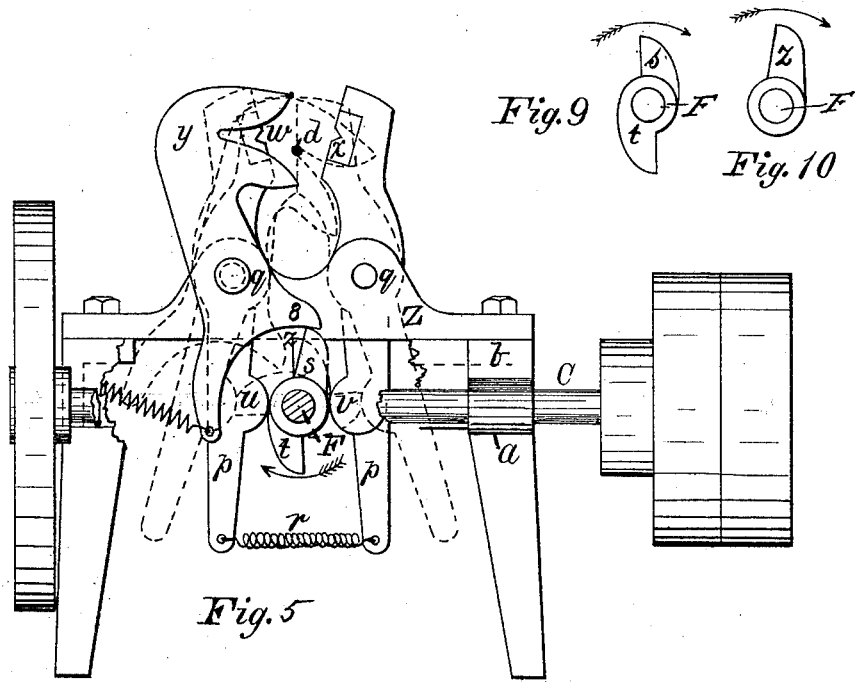
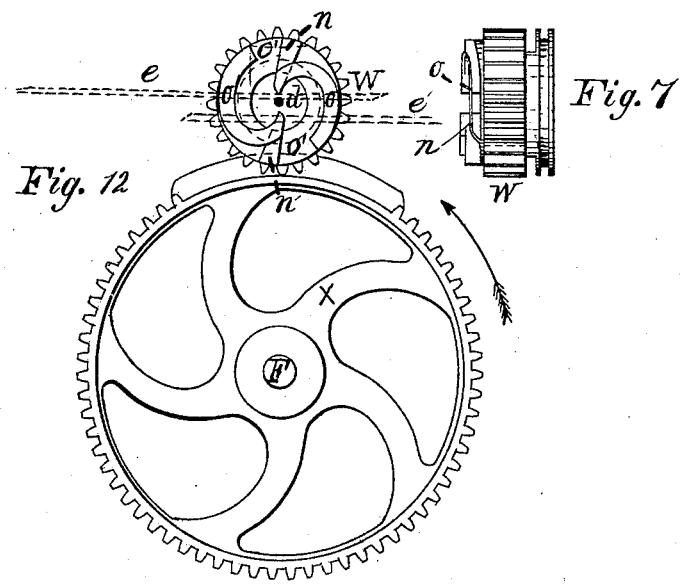
Witnesses
Jas. M. Wishart
Louis Stiele
Inventor
Paul William Leffler
per W. B. Richards, atty (Model.)
P. W. LEFFLER.
Wire Barbing Machine.
No. 232,831. Patented Oct. 5, 1880.
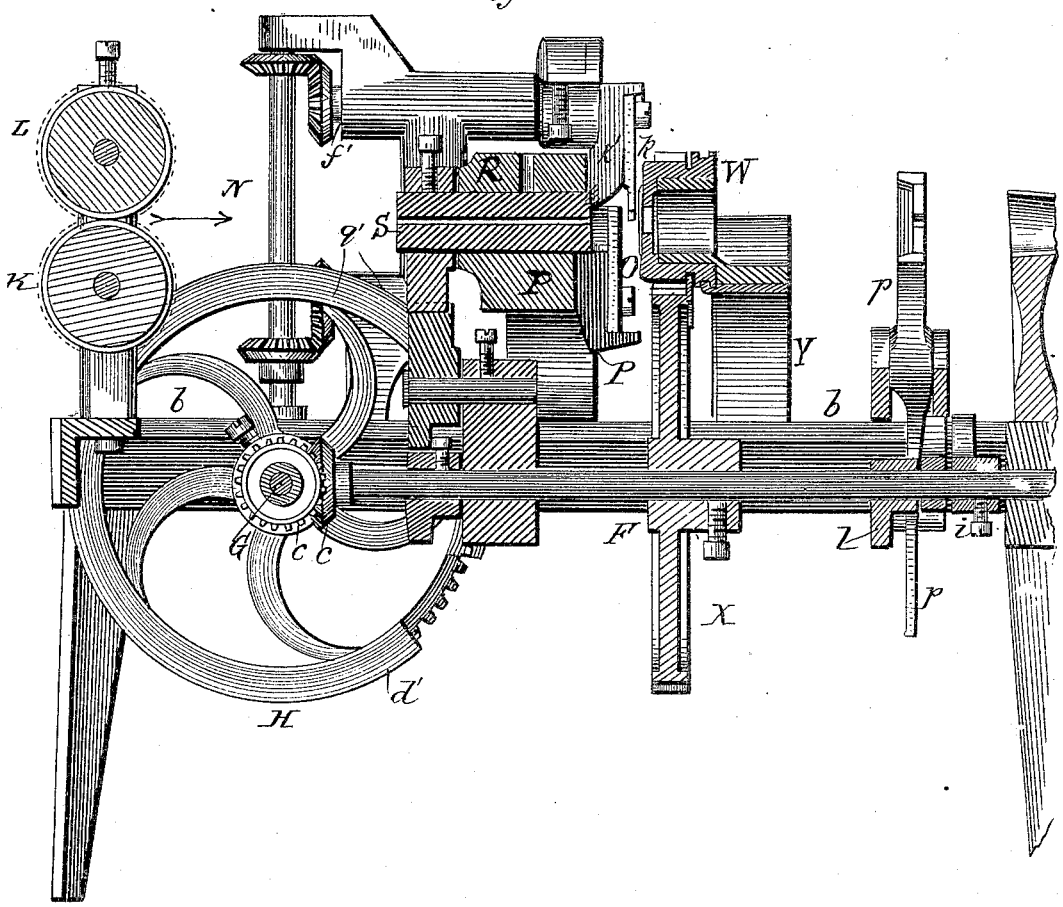
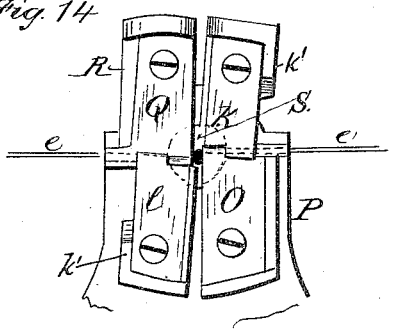
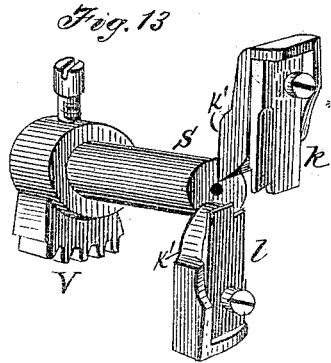
Witnesses
Fred G. Dittrich
Albert H. Krause
Inventor
Paul William Leffler
per
Wm. B. Richards Atty (Model.) 6 Sheets—Sheet 6.

P. W. LEFFLER.
Wire Barbing Machine.

No. 232,831. Patented Oct. 5, 1880.

Witnesses
Fred G. Dieterich
Albert H. Krause

Inventor
Paul William Leffler
by W. B. Richards
atty

UNITED STATES PATENT OFFICE.

PAUL W. LEFFLER, OF GRINNELL, IOWA.

WIRE-BARBING MACHINE.

SPECIFICATION forming part of Letters Patent No. 232,831, dated October 5, 1880.

Application filed March 24, 1880. (Model.)

*To all whom it may concern:*

Be it known that I, PAUL WILLIAM LEFFLER, of Grinnell, in the county of Poweshiek and State of Iowa, have invented certain new and useful Improvements in Wire-Barbing Machines; and I do hereby declare the following to be a full, clear, and exact description of the same, reference being made to the accompanying drawings, forming a part of this specification, in which—

Figure 1:
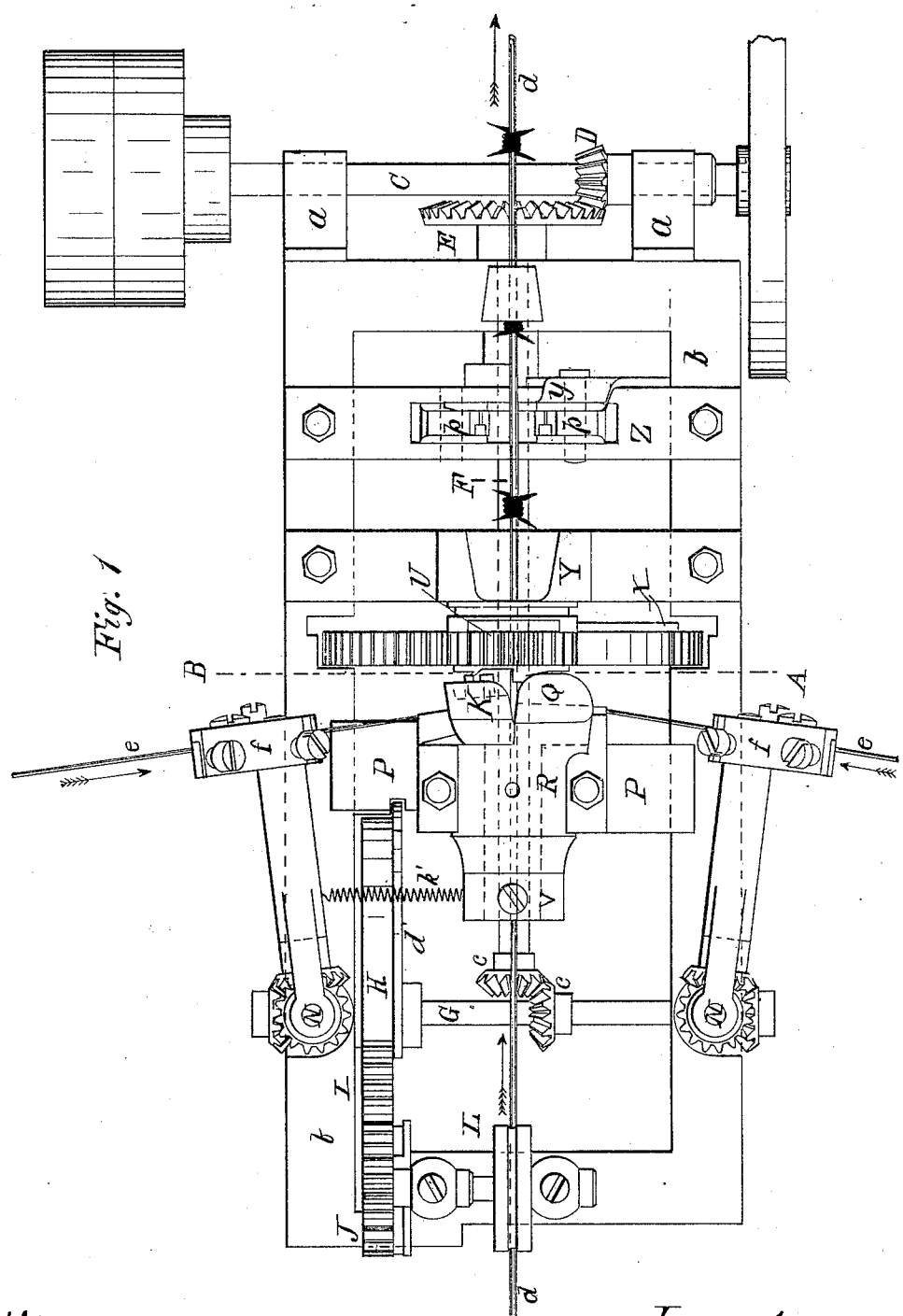
Figure 15:
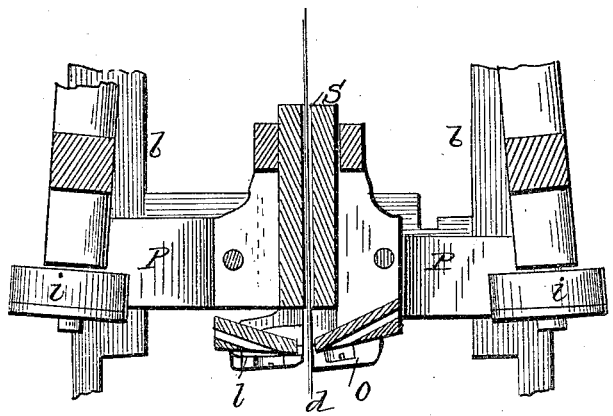

Figure 1 is a plan of a wire-barbing machine embodying my invention. Fig. 2 is a side elevation of the same. Fig. 3 represents the driving-gear for operating the feed-rolls; Fig. 4, a sectional view of a part of the machine on the line A B of Fig. 1; Fig. 5, an end elevation with the main counter-shaft broken away, so as to more clearly show the compressing-jaws; Fig. 6, a longitudinal vertical section through the machine. Figs. 7, 8, 9, 10, 11, 12, 13, 14, 15, 16, 17, 18, 19, and 20 represent detached views of the operating parts of the machine, to be hereinafter referred to.

This invention relates to certain new and useful improvements in the class of wire-barbing machines especially designed for putting a four-pointed barb on a single or double wire; and the invention consists in novel constructions, combinations, and arrangement of parts, to be hereinafter fully described, and specifically pointed out in the claims.

To enable others skilled in the art with which my invention is most nearly connected to make and use the same, I will now proceed to describe its construction and operation.

In the drawings, $b$ represents the frame of the machine, and $a\ a$ bearings which project from one end of the machine, and through which passes the main counter-shaft C, having at one end a tight and loose pulley, and at the other end a balance-wheel. About midway of the shaft C is mounted a bevel-pinion, D, which engages the bevel-gear E, secured to one end of the shaft F, which shaft is made to drive the shaft G through the medium of the miter-gears $c\ c$.

The main wire $d$, to be barbed, is drawn or fed into the machine by means of the following devices: Upon the shaft G is secured the wheel H, which is provided with teeth upon a portion of its circumference, and said teeth are required to match the teeth of the wheel I, which engages with the toothed wheel J. That portion of the circumference of the wheel H not occupied by teeth has a flange, $d'$, projecting from it a short distance, equal to about twice the length of the teeth, while the wheel I (see Fig. 3) has several grooves, I', in its circumference, parallel to its plane of revolution, of proper width and depth to receive the flange $d'$ upon the wheel H during that part of its revolution when its teeth are not engaged with the teeth of the wheel I, and thus producing a positive intermittent rotary motion, and avoiding any possibility of the wheels I and J being revolved forward and backward.

The feed-rolls K and L (see Figs. 1, 2, and 6) are made to partake of the same motion as the wheels I and J by being secured upon their respective shafts.

The main wire $d$, upon which the barbs are to be twisted, is passed between said rolls K and L, and is kept in proper position by means of an annular groove in each roll; and said wire is drawn or fed into the machine at intervals corresponding to the intermittent rotary motion of said rolls, a constant pressure being maintained upon the wire $d$, having any irregularities, by means of adjustable rubber blocks or other springs, M, (see Fig. 2,) said pressure being especially for use in connection with doubled and twisted wire.

The method of feeding the wires $e\ e$, from which the barbs are to be cut, into the machine from both sides of the wire $d$ is illustrated in Fig. 4, in which $f$ and $g$ are arms adapted to be adjustably secured upon one end of horizontal shafts $f'$ and $g'$. These arms $f\ g$ terminate in arcs $h$ and $i$, whose radii are equal to one-half the distance between the centers of the shafts to which their arms are attached, minus a sufficient amount to allow the wires $e\ e$ to be passed in close rolling contact between the upper and lower arcs, when they are brought opposite to each other, between their shafts. At each revolution of the arms $f$ and $g$ the wire is drawn or fed into the machine a distance equal to the part of the arc $h$ which is directly opposite an equal part of the arc $i$. This distance may be regulated by radially adjusting the arms $f$ and $g$ upon their shafts, so as to bring more or less of the faces of the arcs in contact with the wire at the same time.

The arc $h$, upon the arm $f$, may be provided with an adjustable face or die, $h'$, so as to be easily adapted to different sizes of wire, and also to provide for wear. This arrangement is clearly shown in Figs. 4, 18, and 19, by the dotted line in arm $f$ and the set-screws $j\ j$.

The arcs $i\ i$, if deemed expedient, may be faced with hardened steel, or steel dies set into the faces of them to prevent wear.

The shafts $f'\ g'$, upon which the arms $f'\ g$ are secured, are given a uniform rotary motion in opposite directions by being connected with the shaft G through the medium of the vertical shafts N N and the bevel-gearing, as clearly shown in Figs. 2 and 6.

The twister, or the parts which wind the wires $e\ e$ upon the wire $d$ to form the barb, are shown in Fig. 12 and detail views 7, 16, and 17, and in which W represents the winder, and X a gear-wheel, mounted upon the shaft, which imparts to said winder the necessary intermittent rotary motion.

In the present machine the winder is required to make two and one-half revolutions, and then remain stationary during a portion of the time which is required for the gear X to make one revolution. This motion is produced by means of an arrangement of parts similar to that in the main wire-feed described in connection with Fig. 3, the only difference being that the difference between the number of teeth of the wheels W and X, Fig. 12, is required to be greater than that between the teeth of the wheels I and J, Fig. 3.

Figure 16:
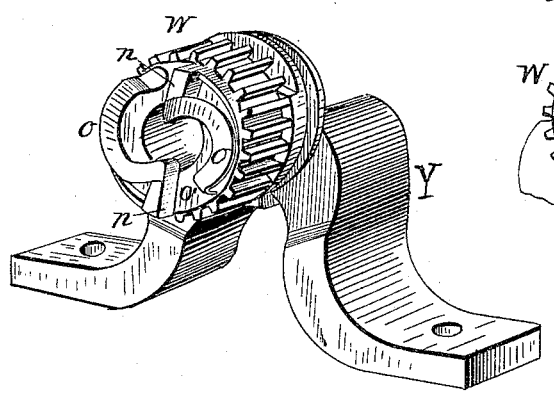
Figure 17:
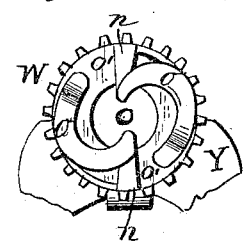
Figure 18:
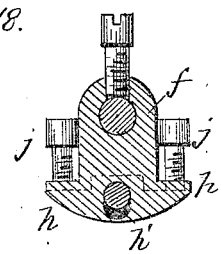
Figure 19:
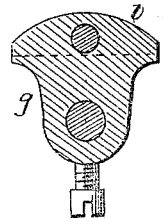
Figure 20:
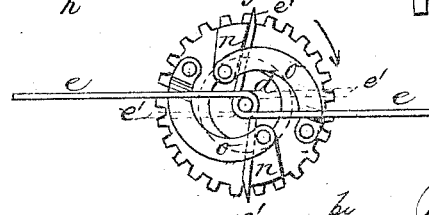

The winder W, Figs. 6, 7, and 16, is supported upon a hollow bearing projecting from the vertical face of the block Y, the opening in said bearing being large enough to allow the main wire and barb, when twisted thereon, to pass through. Projecting from the end of the winder, and located radially and opposite to each other, and reaching from the outer edge nearly to the center of the opening in said bearing, are the lugs $n\ n$, which press against the ends of the wires $e\ e$ as the winder is revolved upon its axis, and thus wind a portion of the wires $e\ e$ upon the main wire $d$, as shown in Fig. 20, after the winder has made one full turn. A guard, $o$, connects the inner ends of each of the lugs $n$ with the outer part of the end of the winder W, which forms spaces $o'\ o'$ between the guards and the end of the winder, through which the wires $e\ e$ are guided, whereby said guards $o\ o$ produce a constant action of the lugs $n\ n$ upon the wires $e\ e$ during the revolution of the winder.

Fig. 4 also illustrates the method of cutting the wires $e\ e$ after a sufficient amount of each has been wound upon the main wire $d$ for each barb. The knife O is secured to the vertical face of the block P, while the knife Q is secured to an arm forming a part of the cap R of the block P, said knives being located diametrically opposite each other, as clearly shown in Figs. 4 and 14. The knives $k$ and $l$ are secured to arms $k'$, radiating from one end, and being a part of the casting which forms the hollow shaft S, Figs. 8 and 13, passing horizontally through the bearing formed between the block P and the cap R. These arms, with their attached knifes $k$ and $l$, are also diametrically opposite to each other, as shown in Figs. 4 and 13, and their cutting-edges extend only a sufficient distance from their inner edges as to diagonally cross the wires $e\ e$ which are to be cut, the remaining portion of the ends of said knives not required for cutting being made longer, so as to lap over the ends of the knives O Q, as shown in detail, Fig. 11, thus forming guides to bring the wires $e\ e$ to the same place on the knife-edges every time, and thereby preventing any irregularity in the lengths of the barbs so cut from the wires $e\ e$.

Motion is communicated to the hollow shaft S, carrying the knives $k$ and $l$, by means of the combination of parts shown in Fig. 8, in which F represents the main shaft, having attached to it the cam T, which, in each revolution of said shaft, acts upon the arm $m$ of the segment-gear U, which engages with and moves the segment-gear V, secured upon the hollow shaft S by a set-screw. By the before-described mechanism said hollow shaft S makes part of a revolution every time the cam T comes in contact with and moves the arm $m$ of the segment U, and thereby bringing the knives $k$ and $l$ into cutting contact with the knives O Q, and thus cutting off the barbs wound around the main wire $d$ from the wires $e\ e$, said knives $k$ and $l$ being returned to their normal position as soon as the segment-gears U V are out of mesh through the medium of the coiled spring $k'$, as clearly shown in Fig. 1.

The object of having the shaft S hollow is to permit the main wire $d$ to pass through it.

Fig. 5 illustrates the device arranged in rear of the winder, (see Fig. 2,) for compressing the barbs upon the main wire, $d$, which is necessary in order that the barbs may retain their position upon said wire.

Z represents a bar or casting extending across and secured to the main frame $b$, in rear of the winder, for supporting the levers $p\ p$, which swing upon the bearings or pins $q\ q$. By the action of a spring, $r$, the lower ends of the levers $p\ p$ are drawn toward each other, thus separating their upper ends or jaws.

$s\ t$, Figs. 5 and 9, represent a double cam mounted upon the shaft F, and arranged to act upon the levers $p\ p$ at the points $u\ v$, the cam $s$ striking the projection upon the lever at $v$, and the cam $t$ striking the projection upon the lever at $u$; thereby during one revolution of the shaft F the cams $s\ t$ will force the lower ends of the levers $p\ p$ apart, which will necessarily bring the upper ends or jaws together, compressing whatever may be between them, in this case the barb upon the main wire.

By the before-described means the barbs are firmly pressed upon and partially into the main wire $d$, thereby preventing the possibility of their being moved from the place where they are compressed by any means which could be applied in the ordinary use of such wire.

Different forms of dies may be inserted at the points $w$ and $x$, thereby giving to the material compressed any form required.

$y$ represents a stop, which prevents the barb from passing beyond the jaws of the levers $p\ p$ until it is acted upon by them. The stop $y$ occupies a position indicated by the dotted line, Fig. 5, until the cam $z$, Fig. 10, in its revolution with the shaft F, comes in contact with it at the point 8, when it is raised to the position shown in plain line, same figure, thereby throwing back the upper end of said stop, and allowing the main wire $d$, with the barb upon it, to pass through.

The operation of my improved machine is as follows: The main wire $d$ being intermittently fed forward through the machine by the feeding mechanism before described, the wires $e\ e$ are intermittently fed to the main wire $d$ from both sides by the revolving arcs $h\ i$, and the ends of the wires $e\ e$ caught by the winder W and twisted or wound around said main wire, and such end portions are subsequently cut off from the wires $e\ e$ through the medium of the knives O Q $k\ l$, when the main wire is fed farther forward, so that the barb will be compressed on the main wire by the compressing-jaws, all as in the manner hereinbefore described, thus completing the operation of putting a four-pointed barb on the wire.

Having thus fully described my invention, what I claim as new, and desire to secure by Letters Patent, is—

1. In a wire-barbing machine, the combination, with the feeding-arcs $h\ i$ and their arms $f\ g$, of the operating mechanism, composed of the horizontal shafts $f'\ g'$, vertical shaft N, and intermediate connecting bevel-gearing and transverse shaft G, connected with said vertical shaft by bevel-gearing, the several parts arranged relatively to each other, substantially in the manner herein shown and described.

2. In a wire-barbing machine, the combination, with the revolving arc $i$, of the revolving arc $h$, provided with an adjustable die, $h'$, substantially as and for the purpose herein shown and described.

3. In a wire-barbing machine, the combination, with the feed-rolls, their shafts, and gear-wheel J, of the gear-wheel I, provided with grooves I' in its circumference parallel to its plane of revolution, and the wheel H, having teeth upon a portion of its circumference, and a flange, $d'$, projecting from that portion of its circumference not occupied by the teeth, whereby a positive intermittent rotary motion may be imparted to said feed-rolls, substantially as specified.

4. In a wire-barbing machine, the combination of the winder W, having teeth upon its circumference and grooves parallel to its plane of revolution, and the wheel X, having teeth upon a portion of its circumference, and a flange projecting from that portion of the circumference not occupied by said teeth, substantially as and for the purpose herein shown and described.

5. In a wire-barbing machine, the winder W, having radial lugs $n\ n$ opposite to each other, extending from the outer edge of said winder to nearly the center of the hollow bearing upon which said winder is mounted, substantially as and for the purpose herein shown and described.

6. In a wire-barbing machine, the winder W, having radial lugs $n\ n$ opposite to each other, and guards $o\ o$, connecting the inner ends of the lugs with the outer edge of the winder, forming spaces $o'\ o'$, through which the wires are guided, substantially as herein shown and described.

7. In a wire-barbing machine, the combination, with the stationary knives O Q, arranged diametrically opposite each other, of the vibrating shaft S, having knives $k$ and $l$, arranged diametrically opposite each other, substantially as and for the purpose herein shown and described.

8. In a wire-barbing machine, the combination, with the knives O Q, arranged as described, of the movable knives $k\ l$, having a portion of their lower ends adapted to lap over said knives O Q, substantially as and for the purpose herein shown and described.

9. In a wire-barbing machine, the combination, with the stationary knives O Q, of the hollow shaft S, provided with the knives $k\ l$, segment-gears U V, and shaft F, provided with cam T, substantially as and for the purpose herein shown and described.

10. In a wire-barbing machine, the combination, with the stationary knives O Q, of the hollow shaft S, provided with the knives $k\ l$, retracting-spring $k'$, segment-gears U V, and shaft F, provided with cam T, substantially as and for the purpose herein shown and described.

11. In a wire-barbing machine, the combination of the pivoted levers $p\ p$, having compressing-jaws at their upper ends, and connected at their lower ends by a spring, $r$, and the revolving double cam $s\ t$, for operating said levers, substantially as and for the purpose herein shown and described.

12. In a wire-barbing machine, the combination, with the pivoted compressing-jaws, of the pivoted stop $y$, and revolving cam $z$, for operating said stop, substantially as and for the purpose herein shown and described.

PAUL WILLIAM LEFFLER.

Witnesses:
JAS. M. WISHART.
LOUIS STEELE.